United States Patent [19]

Hoover

[11] Patent Number: 4,813,734
[45] Date of Patent: Mar. 21, 1989

[54] REMOVABLE CAMPER SHELL APPARATUS FOR TRUCKS

[76] Inventor: Richard Hoover, Box 10850 C.C.S., Cave Creek, Ariz. 85331

[21] Appl. No.: 947,391

[22] Filed: Dec. 29, 1986

[51] Int. Cl.$^4$ .............................................. B60P 3/34
[52] U.S. Cl. ..................................... 296/100; 296/102
[58] Field of Search .................. 296/3, 159, 164, 100, 296/136; 224/42.42, 273; 135/88; 403/241, 382, 393; 248/220.1, 188; 150/52 K

[56] References Cited

U.S. PATENT DOCUMENTS

| | | | |
|---|---|---|---|
| 1,454,220 | 5/1923 | Hall | 150/52 K |
| 2,552,286 | 5/1951 | Kompass | 248/188 |
| 2,950,749 | 8/1960 | MacDonald | 150/52 K |
| 3,202,454 | 8/1965 | Neidlinger | 296/100 |
| 3,354,891 | 11/1967 | Brown | 135/88 X |
| 3,515,426 | 6/1970 | Gerber | 135/88 X |
| 4,152,020 | 5/1979 | Brown et al. | 296/3 |
| 4,215,894 | 8/1980 | Sidlinger | 296/3 |
| 4,332,265 | 6/1982 | Baker | 296/159 |
| 4,509,787 | 4/1985 | Knaack et al. | 296/3 |
| 4,671,203 | 6/1987 | Sanburg | 135/88 X |

FOREIGN PATENT DOCUMENTS 601039 6/1978 Switzerland ........................ 296/136

Primary Examiner—Johnny D. Cherry
Assistant Examiner—Frank H. Williams, Jr.
Attorney, Agent, or Firm—Harry M. Weiss

[57] ABSTRACT

According to the present invention there is provided a removable camper shell apparatus for covering the bed of a pick up truck. The camper shell apparatus consists of a generally rectangular frame made of a plurality of interconnected tubular pipe members having a plurality of biasing members extending downwardly therefrom. Biasing members removably couple and secure the frame to the walls of the bed of a pick up truck. A canvas, nylon or other weather-proof cover is provided and configured to fit over the frame. A continuous cord is disposed along the lower perimeter of the cover and attaches to the body of the truck by a series of hooks or removable securing devices.

10 Claims, 2 Drawing Sheets

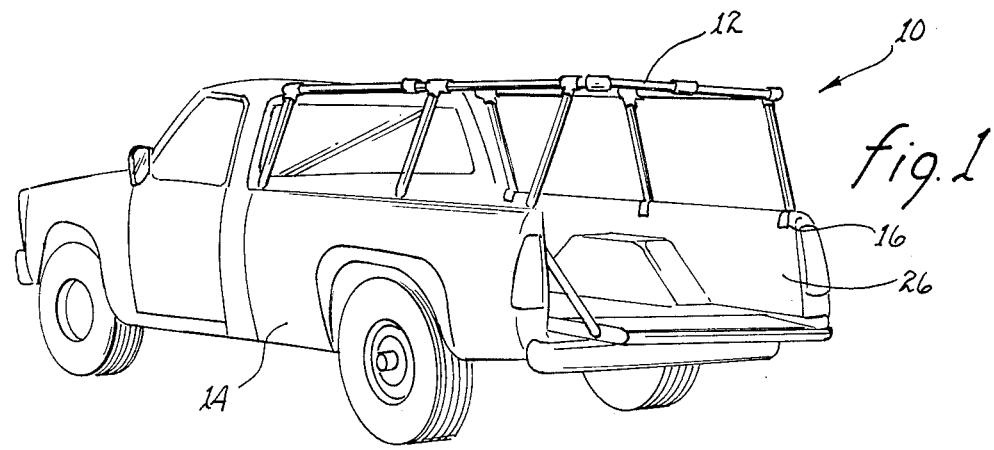
fig. 1
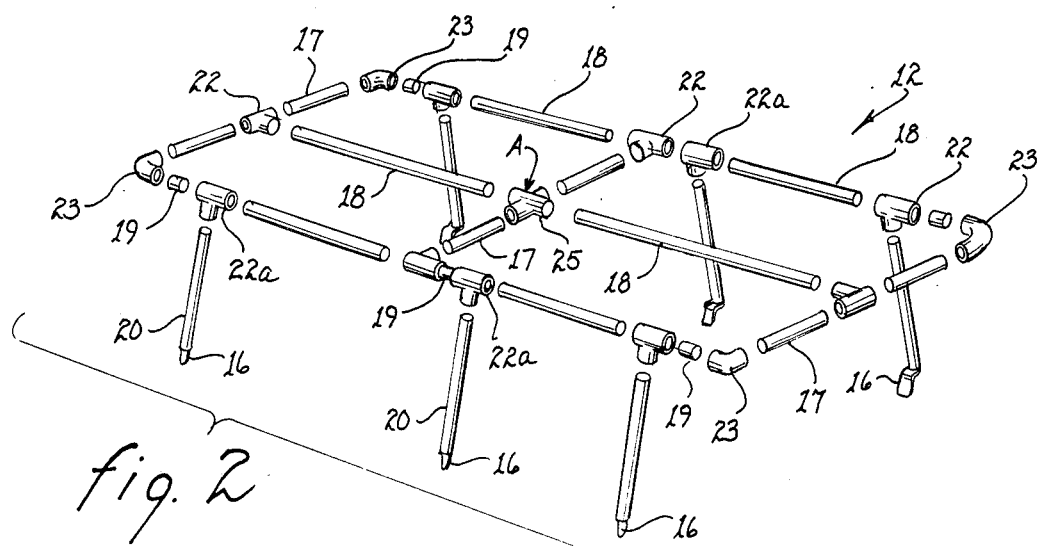
fig. 2
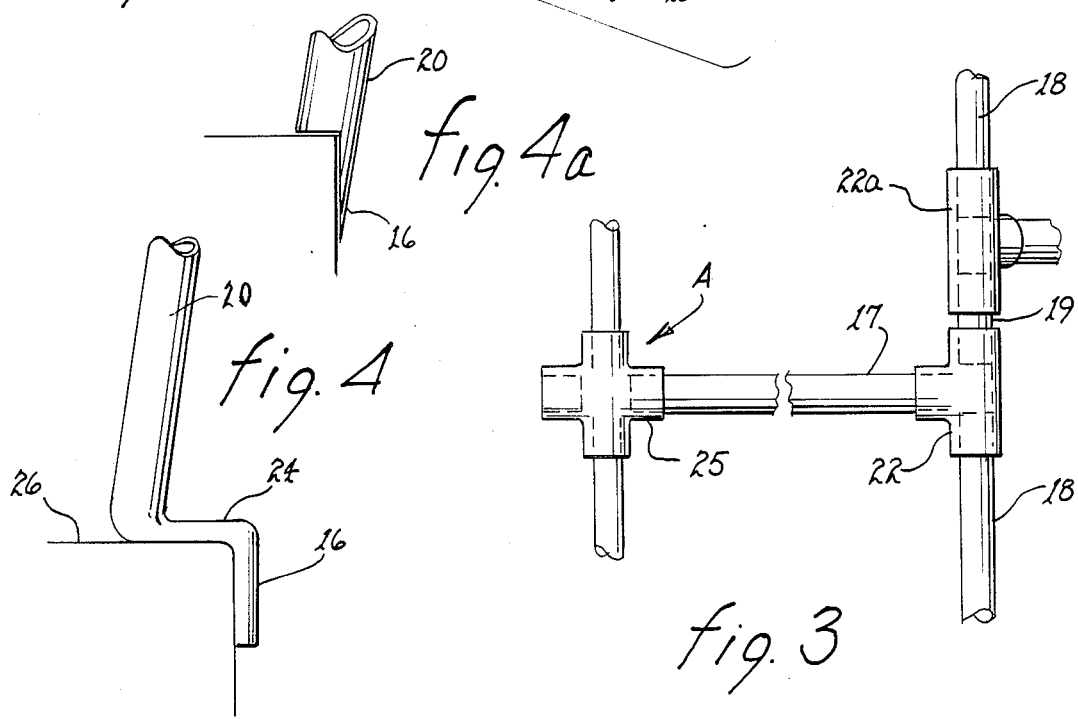
fig. 4a
fig. 4
fig. 3

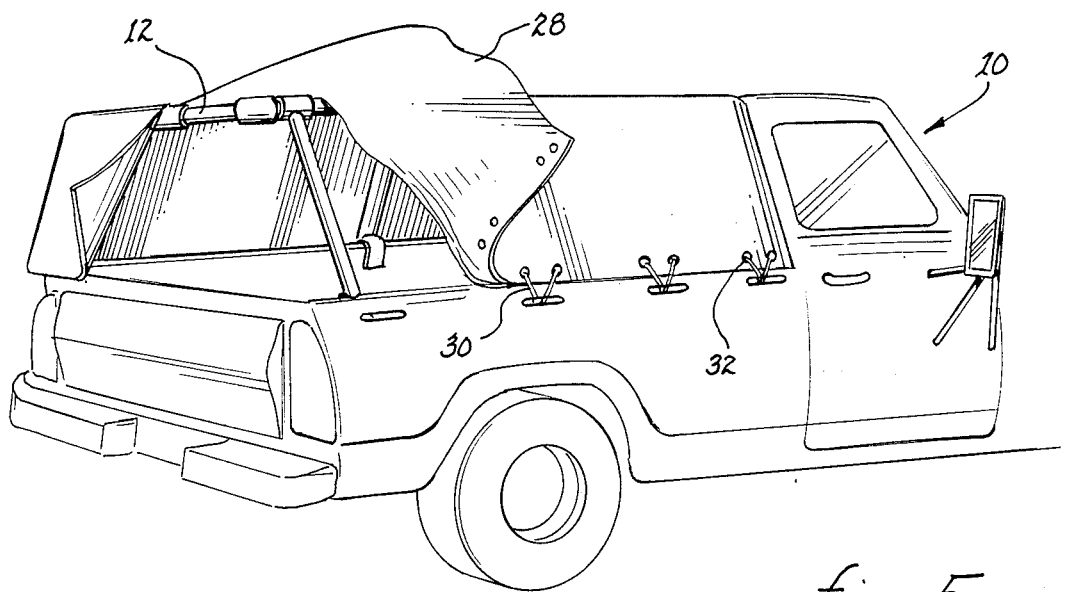
fig. 5
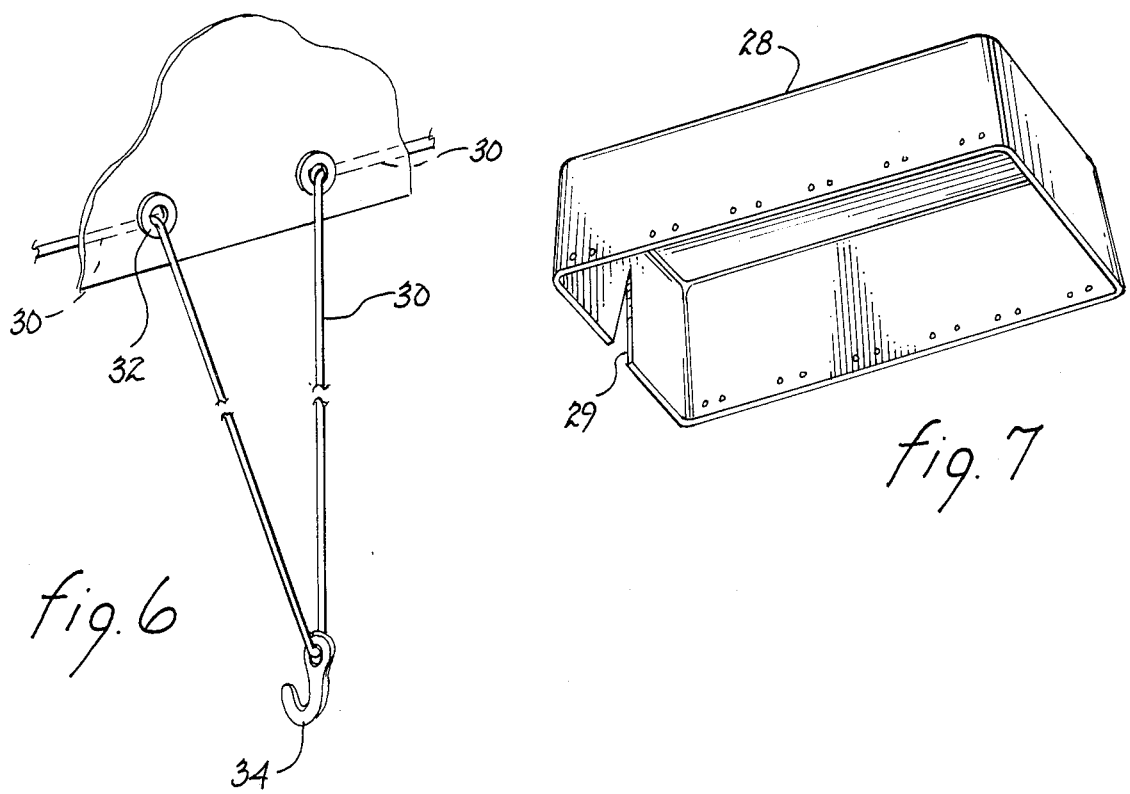
fig. 6
fig. 7

REMOVABLE CAMPER SHELL APPARATUS FOR TRUCKS

BACKGROUND OF THE INVENTION

This invention relates generally to an apparatus for providing coverage for an open bed on a truck. More particularly, the present invention relates to a removable camper shell apparatus which is adapted to fit securely onto the open bed of a pick-up truck. Further, the present invention relates to a camper shell which may be used to provide temporary shelter for the truck occupants.

It has been found highly desirable to provide a means for covering for the open bed of a truck which is light weight and removable. A desirable camper shell should also be structurally sturdy and secure and also provide shelter from the outside environment. Moreover, a desirable camper shell should be collapsible so that it can be stored in the cab of the truck, while being aerodynamically sound. Conventional truck shells are constructed of rigid and heavy materials such as fiberglass or metal and are not easily installed or removed from the truck. Moreover, conventional truck shells require at least two people to install or remove the shell from the bed of the truck. These disadvantageous characteristics of conventional truck shells make it difficult for the truck owner take full advantage of a truck's intended carriage capabilities. A truck equipped with a conventional camper shell cannot, for example, be used to carry a tall object in an upright position without necessitating cumbersome and inconvenient removal of the camper shell. Additionally, conventional camper shells are adapted to fit only upon a specific truck bed and cannot be readily interchanged between different types of pick-up trucks with slightly varying sizes of beds.

There is therefore, a great need to provide a removable camper shell for use with trucks which is not characterized by the disadvantageous propensities characteristic of conventional camper shells.

SUMMARY OF THE INVENTION

Accordingly, it is an object of the present invention to provide a camper shell for use with a truck which is readily removable.

It is another object of the present invention to provide a camper shell for use with a truck which is light weight.

It is still another object of the present invention to provide a camper shell for use with a truck which is structurally sturdy and secure when installed on a truck.

It is yet another object of the present invention to provide a camper shell for use with a truck which may be used to provide shelter or coverage from the external environment.

It is a further object of the present invention to provide a camper shell for use with a pick-up truck which is easily removable and storable within the cab of the truck.

It is a still further object of the present invention to provide a camper shell for use with a pick-up truck which is structurally secure, aerodynamically sound and stable and is capable of withstanding high winds associated with driving.

It is yet a further object of the present invention to provide a camper shell for use with a pick-up truck which is capable of providing shelter and coverage from the external environment.

These and other objects, features and advantages of the present invention will be made more apparent from the following more detailed description of the preferred embodiment of the present invention with reference to the accompanying drawings.

BRIEF DESCRIPTION OF THE DRAWINGS

FIG. 1 is a perspective view of a camper shell apparatus according to the present invention showing the camper shell apparatus frame attached to a pick-up truck.

FIG. 2 is an exploded perspective view of a camper shell apparatus frame according to the present invention showing a plurality of members and associated connecting members.

FIG. 3 is a top elevational view of Section A of FIG. 2 showing a connection between camper shell apparatus frame members.

FIG. 4 is a side elevational view of a camper shell apparatus frame member showing the attachment of the camper shell apparatus frame to a side of the bed of a truck.

FIG. 4a is a side elevational view of an alternative embodiment of a camper shell apparatus frame member showing the attachment of the camper shell apparatus frame to the side of the bed of a truck.

FIG. 5 is a perspective view of a camper shell apparatus according to the present invention showing one embodiment of a means for attachment of the camper shell apparatus covering to the camper shell apparatus frame and to the truck.

FIG. 6 is a perspective view of an attaching means used to secure the camper shell apparatus covering to the camper shell apparatus frame and to the truck.

FIG. 7 is a perspective view of the camper shell apparatus covering.

DESCRIPTION OF THE PREFERRED EMBODIMENT

In FIG. 1 there is shown a camper shell apparatus 10 and a pick up truck 14 having a rear bed with side walls 26. Camper shell apparatus 10 consists of a frame 12 which is attached to the sides 26 of truck 14. FIG. 2 illustrates frame 12 with more particularity. Frame 12, consists of a generally horizontal planar upper portion having generally vertical members extending downwardly therefrom. This is more clearly illustrated by FIG. 2 where there is shown frame 12 consisting of a plurality of hollow frame members 18, forming the generally horizontal planar upper portion and a plurality of biasing members 20 forming the generally vertical members extending downwardly from the generally horizontal planar upper portion of frame 12. Hollow frame members 18 are operably coupled to each other by a plurality of coupling members 22, 23 and 25 to form the generally horizontal planar upper portion of frame 12. Biasing members 20 are similar to hollow frame members 18 but differ in that biasing members 20 have a securing end 16 which is configured in such a manner as to cause biasing members 20 to operably engage sides 26 of truck 14. Biasing members 20 are operably coupled to the upper generally horizontal planar portion of frame 12 by a plurality of coupling members 22. According to a preferred embodiment of the present invention, and with reference to FIG. 4a, there is provided biasing member 20 having a cut-out portion thereof which corresponds to the conformation of the side 26 of the bed of truck 14. The cut out portion of biasing member 20 forms securing end 16 consisting of a tapering protrusion. According to another embodiment of securing end 16, and as illustrated with reference to FIG. 4, there is provided an angled end 24 which is angled to conform to the side of the truck bed, and joins biasing member 20 to securing end 16. By biasing securing end 16 against the sides 26 of truck 14, as shown in FIGS. 4 and 4a, frame 12 is securely and removably coupled to the truck 14.

Preferably, frame members 18 consist of plastic or metal piping, and according to the preferred embodiment consist of polyvinyl chloride ("PVC") plastic pipe of suitable diameter and thickness. It is desirable, according to the preferred embodiment of the present invention to provide about 1.5 inch diameter Schedule 40 PVC pipe.

Hollow frame members 18 and 19 further consist of relatively longer frame members 18, intermediate length cross frame members 17 and relatively short connection members 19. Coupling members 22, 23 and 25 further consist of straight tee fittings 22, 90° elbow fittings 23 and straight cross fitting 25. Preferably, coupling members 18, 23 and 25 consist of plastic or metal piping, and according to the preferred embodiment consist of polyvinyl chloride ("PVC") plastic material of suitable size and thickness.

The generally horizontal planar upper portion of frame 12 is assembled by connecting longer frame members 18 with coupling members 22, consisting of straight tee fittings, therebetween thereby forming the sides of the generally rectangular frame 12. Coupling members 23, consisting of elbow fittings, form the four corners of frame 12, and are connected to cross frame members 17 which form the ends of generally rectangular frame 12. A center span of longer frame members 18 and cross frame members 17 provides a more rigid frame structure. The center span of frame 12 is formed centrally disposing coupling member 25, a straight cross fitting, in the center span, thereby operably connecting longer frame members 18 and cross frame members 17. On each end of frame 12, there is provided coupling member 22, a straight tee fitting, centrally disposed between a plurality, preferably two, cross frame members 17. Cross frame members 17 are, in turn connected to the longitudinal sides formed by hollow members 18 by coupling members 23, the elbow fittings. Short connecting frame members 19, as illustrated by FIG. 3, join horizontally oriented straight tee fittings 22 to either vertically oriented straight tee fittings 22a or to elbow fittings 23.

Biasing members 20 are coupled to hollow members 18 by connecting members 22a, the generally vertically oriented straight tee fittings, and are spaced at intervals from each other so as to support frame 12 on sides 26 of truck 14. Frame 12 is securely attached to sides 26 of truck 14 by biasing securing end 16 of biasing members 20 against sides 26 of truck 14. Biasing members 20 provide a secure means for attaching frame 12 to truck 14 without the use or need to use other attaching means such as nuts and bolts, cotter pins or the like. By obviating the need for additional attaching means such as nuts and bolts, cotter pins or the like, the inventive camper shell frame is readily removable from the truck and employs a minimal amount of set up time.

It is further desirable to provide the camper shell apparatus 10 in a partially pre-assembled form so that frame 12 consists of its major structural elements, thereby increasing ease of set up. For example, cross frame members 17 forming the ends and center span of generally rectangular frame 12 may be pre-joined to coupling members 22 and 25 respectively thereby forming complete end and center span sections of generally rectangular frame 12. It is further preferable to pre-join the cross members 17 forming the center span to both the generally horizontal and generally vertical coupling members 22 and 22a, respectively. Further, it is desirable to pre-join longer frame members 18, vertical coupling member 22a and elbow coupling member 23 thereby forming structural components consisting of half of each side of generally rectangular frame 12. Pre-joining frame 12 into its major structural elements affords a frame 12 which may be broken down and stored in compact form, while retaining the attribute of being easily and quickly set up on the truck.

Turning to FIGS. 5, 6 and 7 there is illustrated a camper shell covering 28 adapted to fit over and surround frame 12. Camper shell covering 28 consists of any suitable weather-resistant material, and preferably consists of a waterproofed canvas or nylon material, such as coated with liquid latex. Grommets 32 are disposed along the lower perimeter of camper shell covering 28. Cord 30, preferably consisting of nylon or other suitable rope material, is disposed along the lower perimeter of camper shell covering and continuously connects grommets 32. Camper shell covering 28 is secured onto frame 12 and onto truck 14 by securing means 34, preferably S hooks or other hooks, which removably attach to the bottom of the truck body 14, or by truck cleats attached to the side of truck 14, as illustrated in FIG. 5. The rear portion of camper shell covering 28 is provided with a slit 29 which provides an opening for access to the truck bed.

When removed, frame 12 may be broken down into its major structural elements and rolled within camper shell covering 28 for storage behind the seat in the truck cab. It has been noticed that the configuration of the present invention permits the wind stresses, generated by driving, to be channeled downwardly which, in turn, adds a further biasing force on the biasing members. In this manner frame 12 is even further secured to the truck bed. Thus, according to the present invention there is provided a camper shell apparatus which is easily removable and storable, yet sufficiently aerodynamically stable and sturdy to withstand the air flow and winds encountered while driving.

While the invention has been particularly shown and described in reference to the preferred embodiments thereof, it will be understood by those skilled in the art that changes in form and details may be made therein without departing from the spirit and scope of the invention.

I claim:

1. A truck camper shell apparatus, comprising:
generally rectangular frame means for removably and frictionally engaging upper side wall portions of a pick-up truck cargo area, said frame means comprising a plurality of hollow tubular frame members and connecting means for detachably interconnecting each of said plurality of hollow tubular frame members, said frame means further comprising a generally horizontal planar upper portion thereof having a plurality of said hollow tubular frame members vertically attached thereto and extending downwardly therefrom and having horizontally oriented interconnecting cross member means for providing structural stability for said frame means, said cross member means being positioned within said horizontal plane and being extended from opposite sides and ends of said upper portion of said frame means; said hollow tubular frame members vertically attached to and extending downwardly from said generally horizontal planar upper portion of said generally rectangular frame means further comprise biasing member means for biasing and securing said generally rectangular frame means to said upper side wall portions of said pick up truck cargo area, cover means adapted to removably and securely fit onto said generally rectangular frame means; and a cord cooperating with said cover means to vertically retain said frame members.

2. The truck camper shell apparatus according to claim 1, wherein said biasing member means further comprises a generally tubular member having a cut-out portion of one end thereof configured to operably and frictionally engage said upper side wall portions of said pick up truck cargo area.

3. The truck camper shell apparatus according to claim 1, wherein said biasing member means further comprises a generally tubular member having one bent end thereof configured to conform to the side wall of the bed of a pick up truck.

4. The truck camper shell apparatus according to claim 2, wherein said tubular member further comprises a securing end thereof having a downward protrusion extending therefrom.

5. The truck camper shell apparatus according to claim 1, wherein said cord comprises a continuous length of cord disposed along the lower perimeter of said cover means, said length of cord having a plurality of hook attaching means for removably connecting said length of cord to the body of a pick up truck.

6. A removable truck camper shell apparatus, comprising:

a generally rectangular frame comprising a plurality of hollow tubular frame members, and comprising a generally horizontal planar upper portion thereof having a plurality of hollow tubular frame members generally vertically attached thereto and extending downwardly therefrom and connecting means for interconnecting each of said plurality of hollow tubular frame members, said upper portion of said frame having horizontally oriented interconnecting cross members being positioned within said horizontal plane and being extended from opposite sides and ends of said upper portion of said frame; said hollow tubular frame members attached to and extending downwardly from said generally horizontal planar upper portion of said generally rectangular frame further comprise biasing member means for biasing and securing said generally rectangular frame to upper side wall portions of a pick up truck cargo area;

cover means adapted to removably and securely fit onto said generally rectangular frame; and a cord cooperating with said cover means to vertically retain said frame.

7. The truck camper shell apparatus according to claim 6, wherein said biasing member means further comprises a generally tubular member having a cut-out portion of one end thereof configured to operably and frictionally engage said upper side wall portions of said pick up truck cargo area.

8. The truck camper shell apparatus according to claim 6, wherein said biasing member means further comprises a generally tubular member having one bent end thereof configured to conform to the side wall of the bed of a pick up truck.

9. The truck camper shell apparatus according to claim 7, wherein said tubular member further comprises a securing end thereof having a downward protrusion extending therefrom.

10. The truck camper shell apparatus according to claim 6, wherein said cord comprises a continuous length of cord disposed along the lower perimeter of said cover means, said length of cord having a plurality of hook attaching means for removably connecting said length of cord to the body of a pick up truck.

* * * * *